United States Patent [19]

Wilson

[11] Patent Number: 5,768,828
[45] Date of Patent: Jun. 23, 1998

[54] COUNTERBALANCING MECHANISM

[76] Inventor: Randy Dale Wilson, 59725 County Rd. 9 South, Elkhart, Ind. 46517

[21] Appl. No.: 655,619

[22] Filed: May 30, 1996

[51] Int. Cl.$^6$ ..................................................... E05F 1/10
[52] U.S. Cl. .............................................. 49/386; 49/197
[58] Field of Search .......................... 49/197, 199, 200, 49/371, 386, 332; 296/57.1, 61; 414/537, 538

[56]  References Cited

U.S. PATENT DOCUMENTS

| | | | |
|---|---|---|---|
| 2,012,528 | 8/1935 | Cooper | 296/57.1 |
| 2,653,845 | 9/1953 | Benjamin | 296/57.1 |
| 2,767,016 | 10/1956 | Wood | 296/57.1 |
| 3,412,423 | 11/1968 | Binnis | 49/200 |
| 3,616,575 | 11/1971 | Harris | 49/200 |
| 3,902,613 | 9/1975 | Newland | 414/538 |
| 3,971,484 | 7/1976 | Anderson et al. | 414/538 |
| 5,254,040 | 10/1993 | Eller et al. | 49/197 |
| 5,380,144 | 1/1995 | Smith et al. | 414/537 |

FOREIGN PATENT DOCUMENTS

| 968819 | 6/1975 | Canada | 49/200 |
|---|---|---|---|

*Primary Examiner*—Kenneth J. Dorner
*Assistant Examiner*—Curtis Cohen
*Attorney, Agent, or Firm*—Ryan M. Fountain

[57]  ABSTRACT

A counterbalancing mechanism for counterbalancing the weight of a door securing an opening in an enclosure. The mechanism has a pair of bearing plates mounted on the wall of the enclosure which rotatably supports a tubular shaft extending therebetween. A pair of spools, each having a cable wound thereon which is attached to the door, are mounted at the ends of the tubular shaft for rotation therewith. A pair of springs, each attached at one end to the tubular shaft and at the other end to a respective bearing plate, extend coaxially about the tubular shaft between the bearing plates to exert a counterbalancing force on the tubular shaft opposing the weight of the door which is transferred to the tubular shaft through the cables and spools. Since each of the springs generates approximately one-half of the necessary counterbalancing force, the door will remain partially counterbalanced even if one of the springs fails.

4 Claims, 5 Drawing Sheets

COUNTERBALANCING MECHANISM

The present invention relates to a mechanism for counterbalancing the weight of a door or hatch as it is opened and closed.

BACKGROUND OF THE INVENTION

Various enclosures including trailers have doors which also serve as access ramps. Typically, the lower edge of such doors is hinged, allowing the door to swing from a vertical closed position to an open position in which the upper edge of the door rests on the ground, the door thereby providing a ramp for easy access to the interior of the enclosure. Often, heavy loads, such as vehicles, travel across such ramps. Thus, to provide the necessary structural integrity, the doors are generally quite heavy. As such, a mechanism is needed to resist the tendency of the doors to slam downwardly with great force during opening or closing.

Conventional mechanisms are undesirable because they employ a single spring, or two springs which operate in conjunction with one another, to generate the counterbalancing force. Very heavy doors require a spring capable of withstanding extremely high torsional force without permanently deforming, loosing its resiliency or breaking. Such large springs are difficult and expensive to obtain. Also, adjusting a single large spring to ensure proper torsional resistance over the range of movement of the door is difficult.

A fundamental problem with conventional counterbalancing mechanisms relates to safety. Since only one spring supports the weight of the door, a spring failure could be disastrous. The doors are typically opened by pulling the door from the top as from a handle or chain, outwardly from the enclosure. The operator typically stands below the door as the top pivots outwardly, then moves from under the door as it approaches a horizontal attitude. Similarly, such doors are pushed into a vertical, closed position by walking under the door toward the enclosure. If a spring fails or becomes disconnected from the shaft during opening or closing, the full weight of the door swings downwardly onto the operator below, potentially resulting in serious injury or death.

SUMMARY OF THE INVENTION

The present invention provides an economical, safe, dual spring mechanism for counterbalancing a ramp door for an enclosure such as a cargo trailer. The invention comprises, in one form thereof, a tubular shaft transversely suspended adjacent the upper edge of the door opening between bearing plates. The tubular shaft carries two spools of wound cable. Each cable is attached to the upper part of the door. A pair of springs are coaxially disposed about the tubular shaft between the bearing plates. One end of each spring is attached to a respective bearing plate, and the other end is attached to the tubular shaft. When the door is opened, the cables unwind which causes the spools, and thus the tubular shaft, to rotate in a direction opposing the bias of the springs. The weight of the door is thereby relieved by the torsional resistance of the springs.

Adjustment of the dual spring mechanism of the present invention to provide proper torsional resistance over the range of movement of the door is easier than adjustment of a single spring mechanism. Also, each spring operates independently. This provides redundancy which greatly enhances the safety of the mechanism. If one spring fails, the remaining spring continues to resist downward movement of the door, giving the operator time to avoid injury.

Additionally, the counterbalancing mechanism of the present invention facilitates adjustment of the initial bias of the springs. The cables connected to the door wind onto and off of the spools from the bottom as opposed to over the top. Thus, the spring bias is in a direction to rotate the tubular shaft such that the cables wind onto the spools from the bottom. To accomplish this bias, the spring ends attached to the tubular shaft are rotated with a lever from the inside of the enclosure to the outside so that the reaction force rotates the spools in a direction to pull the cables inwardly. Since the initial bias is set with the door in a substantially horizontal, fully opened position, the operator can advantageously swing the adjustment lever arm nearly 180 degrees around the tubular shaft from the top of the enclosure, through the opening, and outwardly away from the enclosure.

Accordingly, it is an object of the present invention to provide an improved mechanism for counterbalancing a door.

Another object of the invention is to provide a counterbalancing mechanism that utilizes inexpensive, readily available springs.

Another object of the invention is to provide a counterbalancing mechanism with independently operable springs for enhanced safety.

BRIEF DESCRIPTION OF THE DRAWINGS

The above-mentioned and other objects and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, and such exemplification is not to be construed as limiting the scope of the invention in any manner.

DESCRIPTION OF THE INVENTION

Figure 1:
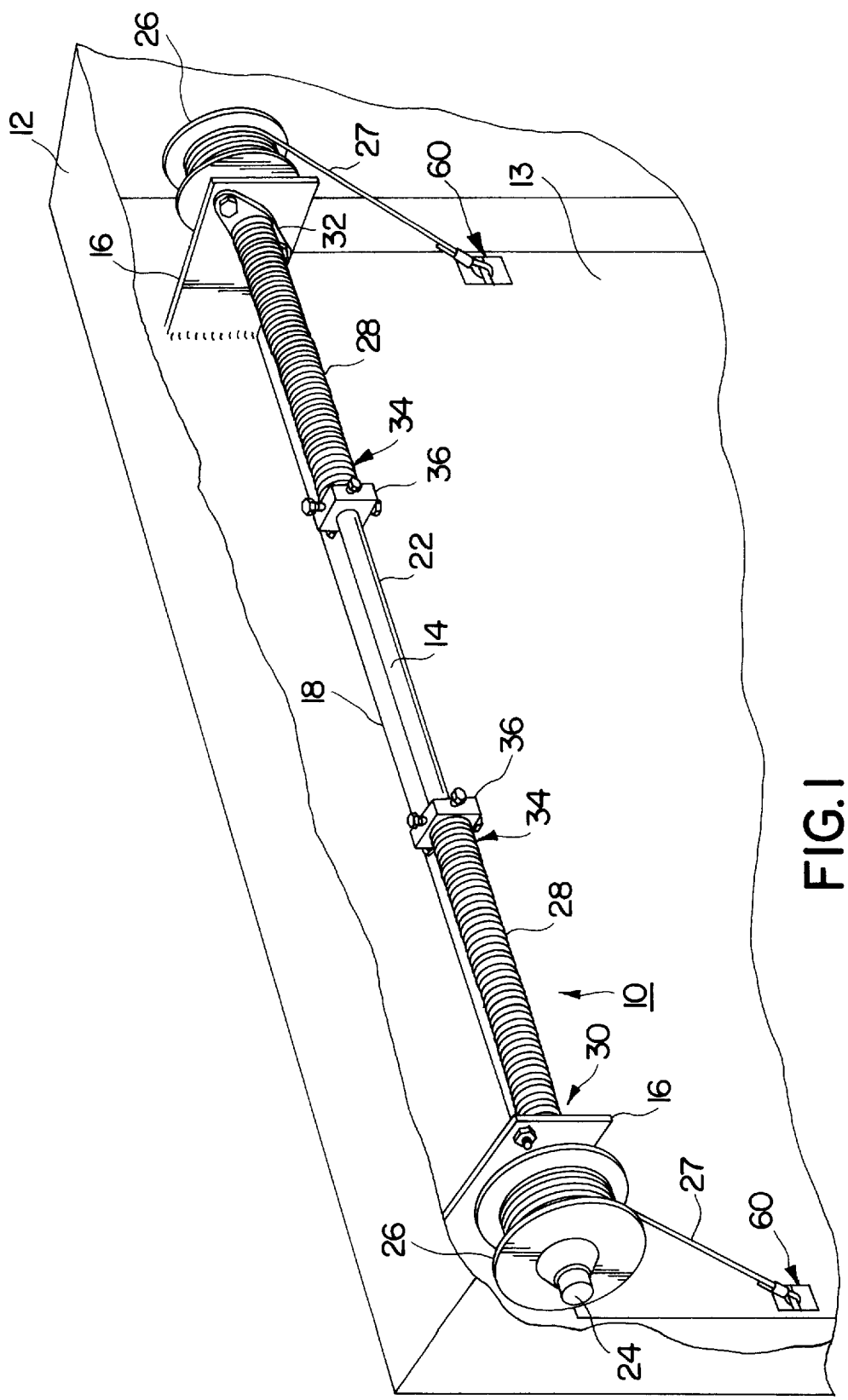
FIG. 1 is a fragmented, perspective view of the counterbalancing mechanism of the present invention.

FIG. 1 shows the counterbalancing mechanism 10 of the present invention mounted to a trailer 12 adjacent the trailer access door 13. Mechanism 10 includes a rod or tubular shaft 14 which extends through and is supported between two bearing plates 16 mounted to the interior of trailer enclosure 12 adjacent the door opening 20. Tubular shaft 14 extends substantially the full width of opening 20. Bearing plates 16 include facing surfaces 23 and opposite surfaces 25 and extend perpendicularly inwardly toward the interior of trailer 12 from the upper edge 18 of the trailer back wall forming opening 20. The end portions 24 of tubular shaft 14 that extend through bearing plates 16 further extend through spools 26 which are attached to tubular shaft 14. Each spool 26 carries a cable 27 which is attached to door 13 in a manner described in detail below.

Figure 2:
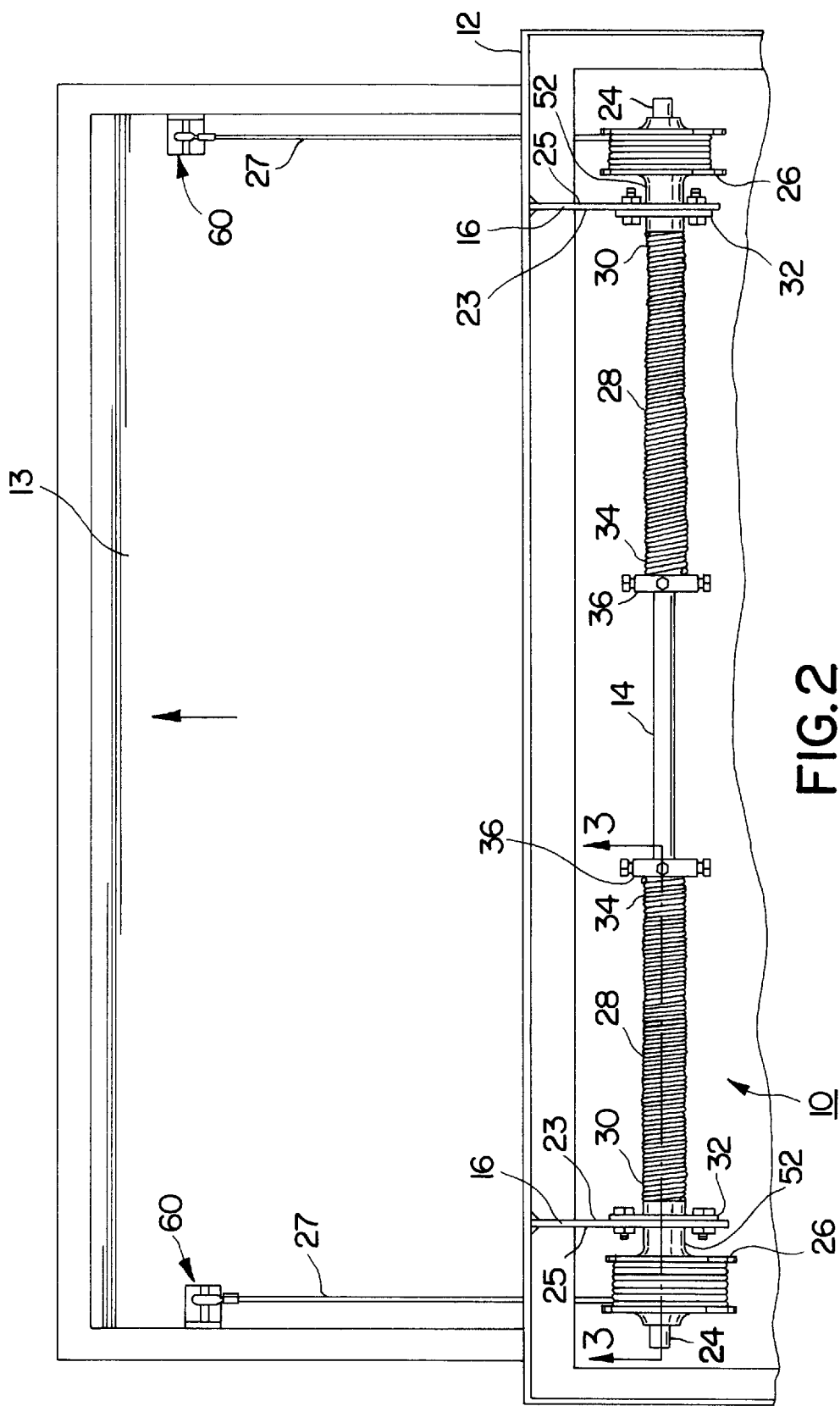
FIG. 2 is a fragmented top plan view of the mechanism shown in FIG. 1.
Figure 3:
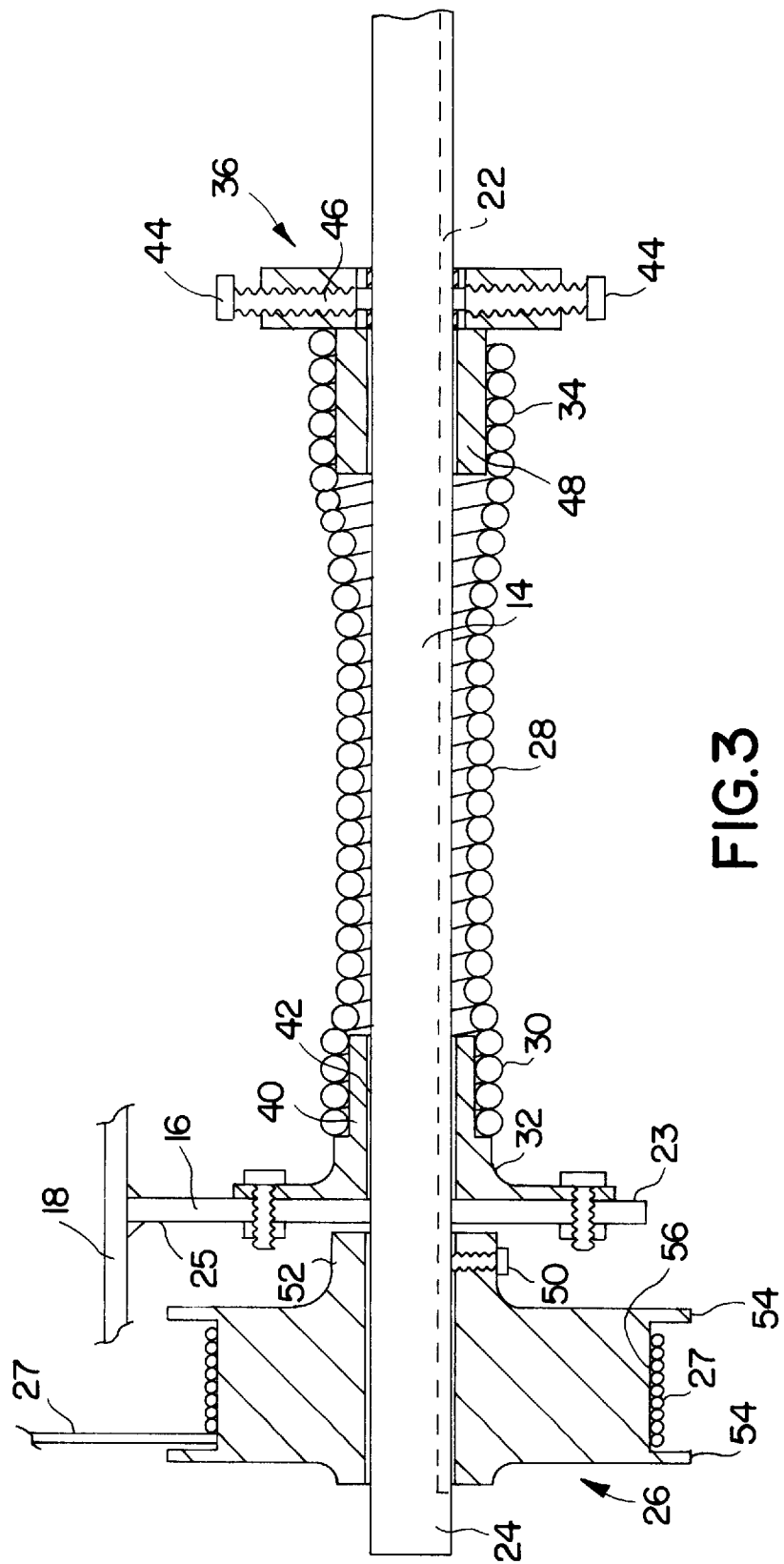
FIG. 3 is a fragmented cross-sectional view taken along line 3—3 of FIG. 2.

Two coil springs 28 are disposed coaxially about tubular shaft 14 between facing surfaces 23 of bearing plates 16 as shown in FIGS. 1 and 2. Each spring 28 is connected at one end 30 to a bracket 32 and at the other end 34 to a bearing cone 36. As best shown in FIG. 3, bracket 32 includes a cylindrical shoulder 40 defining bore 42 which receives tubular shaft 14. Bracket 32 is connected to bearing plate 16 using common fasteners. The outside diameter of cylindrical shoulder 40 is slightly larger than the nominal inside diameter of spring 28 to provide a press or friction fit of spring 28 onto shoulder 40.

Each bearing cone 36 includes a plurality of screws 44 which extend through threaded bores 46 into frictional engagement with tubular shaft 14. At least one set screw 44 extends into tubular shaft 14 to prevent rotation of cone 36 relative to tubular shaft 14. Each bearing cone 36 also includes a cylindrical shoulder 48 of similar size and function as cylindrical shoulder 40 extending from bracket 32. End 34 of each spring 28 fits over a respective shoulder 48 in a friction fit.

Figure 4:
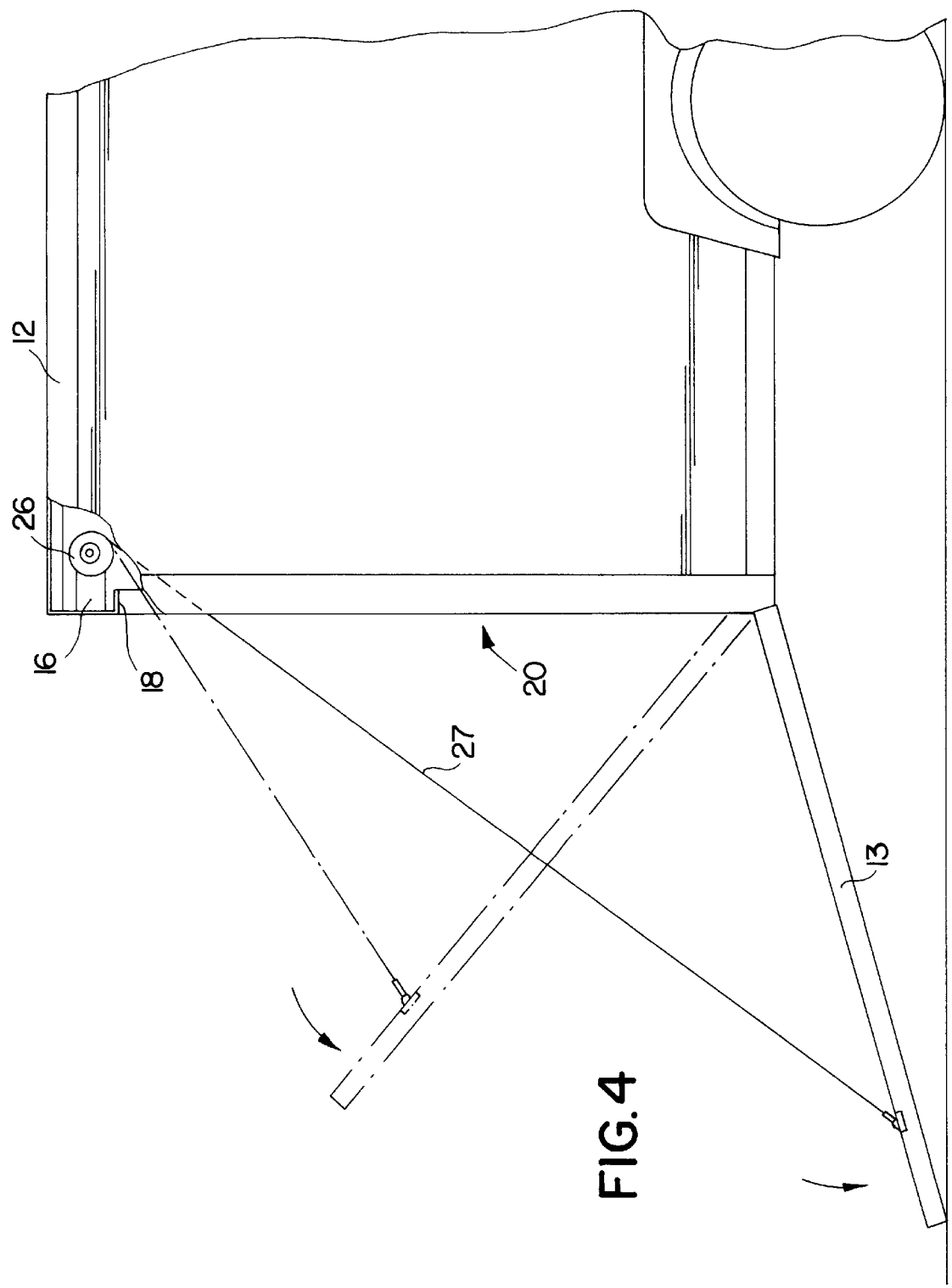
FIG. 4 is a fragmented side view depicting the operation of an access door counterbalanced by the present invention.

Each spool 26 is coaxially disposed about tubular shaft 14 and held in fixed relationship thereto by set screw 50 which extends through annular spacer portion 52 and is received by groove 22. Spools 26 are attached to end portions 24 of tubular shaft 14 such that the distance between annular spacer portions 52 is slightly greater than the distance between the opposite surfaces 25 of bearing plates 16. As such, tubular shaft 14 rotates freely, yet spacer portions 52 center tubular shaft 14 between bearing plates 16. Spools 26 include circular walls 54 which extend radially outwardly from tubular shaft 14 and are connected together by a cylindrical web 56. A cable 27 is connected at one end (not shown) to each web 56, wound about web 56 between walls 54, and connected at the other end to a connection location 60 disposed adjacent the upper edge of door 13. Cables 27 are wound about webs 56 such that the cables 27 wind onto and off of spools 26 from the bottom. As shown in FIG. 4, by being so wound, cables 27 avoid interference with upper edge 18 of opening 20.

Mode of Operation

Figure 5:
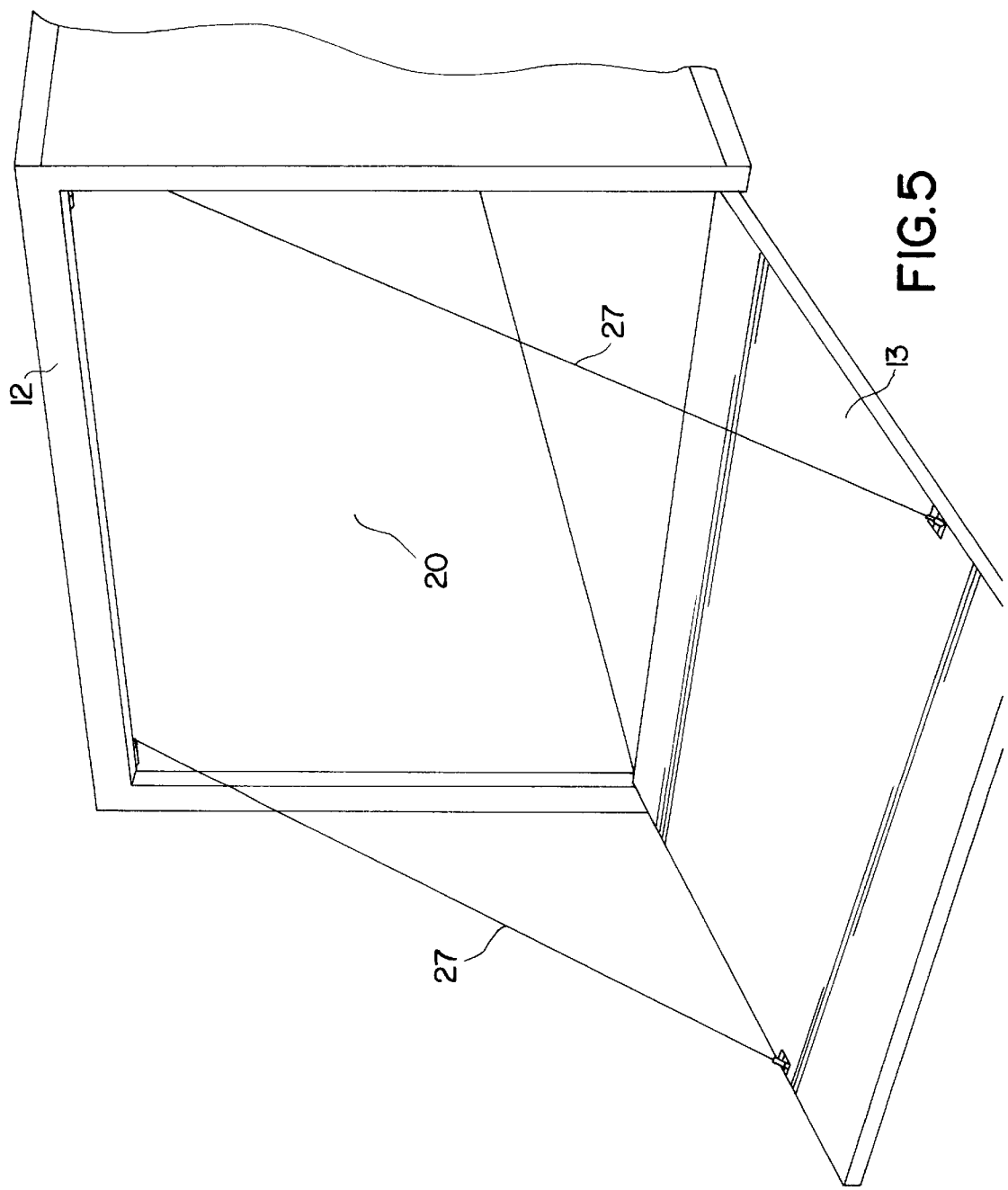
FIG. 5 is a fragmented perspective view similar to FIG. 4.

The counterbalancing mechanism 10 of the present invention, once installed, is adjusted for operation by imparting an initial spring bias to tubular shaft 14. With door 13 in a substantially horizontal, open position as shown in FIGS. 4 and 5, spools 26 are rotated about tubular shaft 14 until cables 27 extend tightly from connection locations 60. Then, spool 26 set screws 50 are tightened to secure spools 26 to tubular shaft 14. The initial spring bias is generated by rotating bearing cones 36 about tubular shaft 14 in a clockwise direction relative to the view of FIG. 4 to create a counter-clockwise reaction force which further tightens cables 27. Bearing cones 36 are further rotated until the spring counterbalancing force is nearly sufficient to lift or raise door 13. The spring configuration of the present invention advantageously permits initial tightening of springs 28 by rotating a tightening tool from within the enclosure 12 outwardly about bearing cones 36. Also, bearing cones 36 are advantageously rotated in the same direction. Once springs 28 are tightened, bearing cones 36 are secured to tubular shaft 14 by screws 44 and the door 13 is lifted, with the aid of the spring force, into a vertical, closed position.

As door 13 is lifted, since ends 30 of springs 28 are fixed to the wall of the enclosure 12 through brackets 32 and bearing plates 16, ends 34 of springs 28 impart torque onto bearing cones 36 to rotate tubular shaft 14. Spools 26 rotate accordingly, and cables 27 wind under spools 26 onto webs 56. As door 13 is further lifted, springs 28 continue to uncoil and provide counterbalancing lifting force. However, as door 13 arcs upwardly toward opening 20 about its hinged or pivotal connection to the lower edge of opening 20 (not shown), the counterbalancing spring force diminishes according to principles well known by those skilled in the art.

When door 13 reaches a vertical, closed position, cables 27 are recoiled tightly around spools 26 as shown in FIG. 1. Even though, as door 13 is lifted into the closed position, tubular shaft 14 experiences multiple rotations which uncoil springs 28 from their initial tightened state, springs 28 continue to exert residual torsional force on tubular shaft 14.

When door 13 is pulled outwardly and down toward an open position, cables 27 unwind from the bottom of webs 56 and spools 26 rotate. The spool rotation causes tubular shaft 14 to rotate accordingly. As tubular shaft 14 rotates, attached bearing cones 36 also rotate and tighten ends 34 of springs 28. As door 13 is further lowered, springs 28 become increasingly deformed and impart increasing torsional force to tubular shaft 14 in a direction to counterbalance the weight of door 13. When door 13 is fully lowered, springs 28 are returned to the predetermined initial bias which corresponds to a counterbalancing force sufficiently low to permit the door to remain lowered under its own weight, but sufficiently high to enable manual lifting of the door.

It will be noted that each of the springs 28 exert substantially the same force on tubular shaft 14, and that this force is approximately one-half of the force necessary to counterbalance door 13. Accordingly, door 13 remains partially counterbalanced even in the event that one spring 28 breaks, so that a closed door 13 will remain closed instead of dropping immediately to the open position. Furthermore, if a spring 28 breaks when door 13 is being opened or closed, door 13 will drop to the open position, but with less force than would be the case using a single spring system, an important safety feature of the present invention.

As should be apparent from the foregoing, one skilled in the art could easily adapt the counterbalancing mechanism of the present invention to counterbalance various doors including garage doors, downwardly opening hatches, gateways and other types of enclosure access means. Accordingly, while this invention has been described as having an exemplary embodiment, this application is intended to cover any variations, uses, or adaptations of the invention falling within the spirit and scope of this disclosure using its general principles. Further, this application is intended to cover such departures from the present disclosure as come within known or customary practice in the art to which this invention pertains and which fall within the limits of the appended claims.

What is claimed is:

1. An apparatus closing an opening in a wall, comprising:
    a door member hinged to the wall adjacent the bottom of the opening so as to permit upward pivotal movement of the door member to close the opening,
    a plurality of cables attached to the door member and connected to the wall adjacent the top of the opening,
    counterbalancing means, connected to the wall adjacent the top of the opening, for applying force to the cables to at least in part counterbalance the weight of the door member and thereby facilitate movement of the door member about the hinge, and
    the counterbalancing means including at least two spring elements, each of which independently applies a portion of the force to each of the cables, wherein each spring element is tensioned so as to be able to independently restrain the door against opening once the door is in a closed position.

2. The apparatus according to claim 1 wherein the counterbalancing means includes a common drive shaft connected to each of the spring elements, and a plurality of spools means, mounted on the shaft at spaced apart locations, each for winding and unwinding one of the cables thereon from the lower portion of the spool.

3. The apparatus according to claim 2 wherein the spring elements are tensioned so as to provide progressively less counterbalancing force to the cables as the door pivots toward a closed position.

4. The apparatus according to claim 3 wherein the opening is disposed within a wall of a vehicle body to provide access thereto, that vehicle having a floor and a ceiling portion, the bottom of the opening being adjacent the floor and the top of the opening being below the ceiling, the interior space therebetween defining a receptacle for containing counterbalancing means.

* * * * *